United States Patent
LaValle et al.

(10) Patent No.: US 9,897,807 B2
(45) Date of Patent: Feb. 20, 2018

(54) PERCEPTION BASED PREDICTIVE TRACKING FOR HEAD MOUNTED DISPLAYS

(71) Applicant: Oculus VR, LLC, Menlo Park, CA (US)

(72) Inventors: Steve LaValle, Irvine, CA (US); Peter Giokaris, Pomona, CA (US)

(73) Assignee: Oculus VR, LLC, Menlo Park, CA (US)

( * ) Notice: Subject to any disclaimer, the term of this patent is extended or adjusted under 35 U.S.C. 154(b) by 117 days.

(21) Appl. No.: 15/135,899

(22) Filed: Apr. 22, 2016

(65) Prior Publication Data

US 2016/0238841 A1  Aug. 18, 2016

Related U.S. Application Data

(63) Continuation of application No. 14/702,314, filed on May 1, 2015, now Pat. No. 9,348,410, which is a
(Continued)

(51) Int. Cl.
*G02B 27/01* (2006.01)
*G06F 3/01* (2006.01)
(Continued)

(52) U.S. Cl.
CPC ....... *G02B 27/017* (2013.01); *G02B 27/0093* (2013.01); *G06F 3/012* (2013.01); *G06T 5/002* (2013.01); *G06T 2207/20182* (2013.01)

(58) Field of Classification Search
CPC ... G02B 27/017; G02B 27/0093; G06F 3/012; G06T 5/002; G06T 2207/20182
See application file for complete search history.

(56) References Cited

U.S. PATENT DOCUMENTS 7,729,515 B2  6/2010  Mandella et al.
7,826,641 B2  11/2010  Mandella et al.
(Continued)

FOREIGN PATENT DOCUMENTS

JP  3802653 B2  7/2006
JP  2008-233765 A  10/2008
(Continued)

OTHER PUBLICATIONS

Korean Second Office Action, Korean Application No. 10-2015-7035156, dated Mar. 17, 2017, 6 pages.
(Continued)

*Primary Examiner* — Charles Hicks
(74) *Attorney, Agent, or Firm* — Fenwick & West LLP

(57) ABSTRACT

There is disclosed a method of and apparatus for predictive tracking for a head mounted display. The method comprises obtaining one or more three-dimensional angular velocity measurements from a sensor monitoring the head mounted display and setting a prediction interval based upon the one or more three-dimensional angular velocity measurements such that the prediction interval is substantially zero when the head mounted display is substantially stationary and the prediction interval increases up to a predetermined latency interval when the head mounted display is moving at an angular velocity of or above a predetermined threshold. The method further includes predicting a three-dimensional orientation for the head mounted display to create a predicted orientation at a time corresponding to the prediction interval, and generating a rendered image corresponding to the predicted orientation for presentation on the head mounted display.

21 Claims, 8 Drawing Sheets

Related U.S. Application Data continuation of application No. 14/285,470, filed on May 22, 2014, now Pat. No. 9,063,330.

(60) Provisional application No. 61/829,008, filed on May 30, 2013.

(51) Int. Cl.
*G02B 27/00* (2006.01)
*G06T 5/00* (2006.01)

(56) References Cited

U.S. PATENT DOCUMENTS

| | | |
|---|---|---|
| 7,961,909 B2 | 6/2011 | Mandella et al. |
| 8,542,219 B2 | 9/2013 | Carl et al. |
| 8,553,935 B2 | 10/2013 | Mandella et al. |
| 2004/0051680 A1 | 3/2004 | Azuma et al. |
| 2004/0080467 A1 | 4/2004 | Chinthammit et al. |
| 2012/0038549 A1 | 2/2012 | Mandella et al. |
| 2012/0242560 A1 | 9/2012 | Nakada et al. |
| 2013/0194418 A1 | 8/2013 | Gonzalez-Banos et al. |
| 2013/0285885 A1 | 10/2013 | Nowatzyk et al. |

FOREIGN PATENT DOCUMENTS

| | | |
|---|---|---|
| JP | 2010-256554 A | 11/2010 |
| WO | WO 97/20244 A1 | 6/1997 |
| WO | WO 2012/177657 A2 | 12/2012 |

OTHER PUBLICATIONS

Chinese Second Office Action, Chinese Application No. 2014800312656, dated Mar. 29, 2017, 7 pages.
Azuma, R. et al., "Improving Static and Dynamic Registration in an Optical See-Through HMD," SIGGRAPH 94 Conference Proceedings [Computer Graphics: Annual Conference Series; 1994], Jul. 24-29, 1994, pp. 197-204.
Chinese First Office Action, Chinese Application No. 2014800312656, dated Oct. 8, 2016, 11 pages.
Deering, M., "High Resolution Virtual Reality," Computer Graphics, ACM, Jul. 1992, pp. 195-202, vol. 26, No. 2.
European Extended Search Report, European Application No. 14804658.4, dated Dec. 6, 2016, 11 pages.
Korean Office Action, Korean Application No. 10-2015-7035156, dated Nov. 3, 2016, 6 pages.
List, U.H., "Nonlinear Prediction of Head Movements for Helmet-Mounted Displays," Air Force Human Resources Laboratory Technical Paper, Dec. 1983, 12 pages, vol. 83-45.
Azuma, R., "A Survey of Augmented Reality," In Presence: Teleoperators and Virtual Environments, Aug. 1997, pp. 355-385, vol. 6, No. 4.
Azuma, R., "Predictive Tracking for Augmented Reality," Dissertation, The University of North Carolina at Chapel Hill, Department of Computer Science, Feb. 1995, two hundred sixty-two pages.
PCT International Search Report and Written Opinion, PCT Application No. PCT/US2014/040086, dated Aug. 19, 2014, eight pages.
United States Office Action, U.S. Appl. No. 14/285,470, dated Aug. 6, 2014, 13 pages.
Australian First Examination Report, Australian Application No. 2014274101, dated Jul. 4, 2016, 2 pages.
Australian First Examination Report, Australian Application No. 2017200163, dated Oct. 31, 2017, 2 pages.

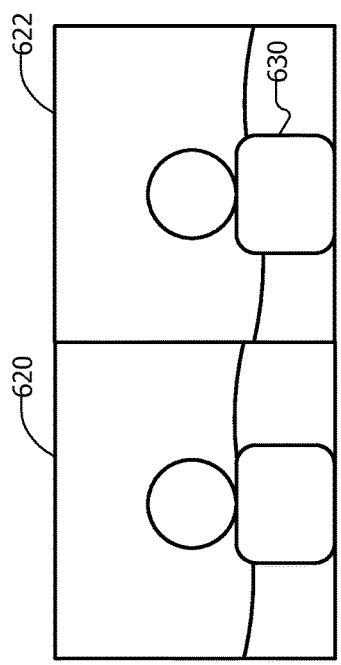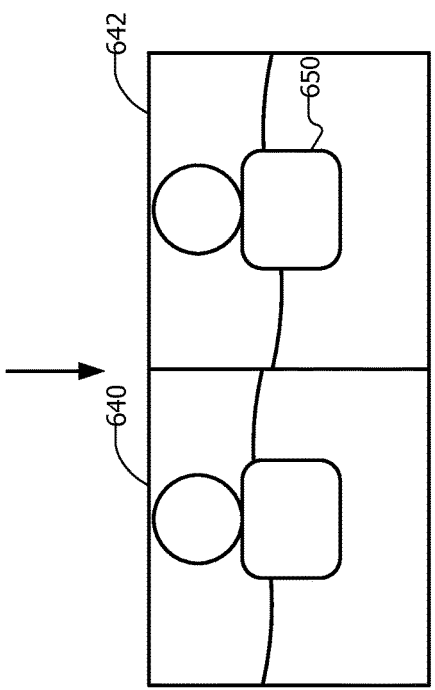
FIG. 6A
FIG. 6B
FIG. 6

PERCEPTION BASED PREDICTIVE TRACKING FOR HEAD MOUNTED DISPLAYS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This application is a continuation of U.S. patent application Ser. No. 14/702,314, filed May 1, 2015, which is a continuation of U.S. patent application Ser. No. 14/285,470, filed May 22, 2014, Now U.S. Pat. No. 9,063,330, which claims the benefit and priority of U.S. Provisional Patent Application Ser. No. 61/829,008, filed May 30, 2013, all of which are hereby incorporated by reference.

BACKGROUND

Field

This disclosure relates to predictive motion tracking for a head mounted display.

Description of the Related Art

Head mounted displays have long been used in virtual reality and augmented reality systems. Virtual reality systems, typically, envelop a wearer's eyes completely and substitute a "virtual" reality for reality. These virtual reality environments may be crude, either intentionally or through lack of capability of the virtual reality system. However, virtual reality environments may also be detailed, interactive and quite complex, involving virtual people, conversations and experiences. The most obvious exemplar of a virtual environment may be a video game involving a player character interacting with a game world. However, virtual environments need not be games and may, instead, be educational experiences, group activities (such as a tour of a historical site), or merely sitting in a virtual room with an avatar representative of a friend and carrying on a conversation.

Augmented reality systems, in contrast, typically provide an overlay semi-transparent or transparent screen or screens in front of a wearer's eyes such that reality is "augmented" with additional information, graphical representations, or supplemental data. Augmented reality may, for example, superimpose "virtual" people, items, cars, rooms, spaces, signs and other data over reality to a viewer. Simple augmented reality systems may simply provide information regarding the scene or area being viewed (e.g. temperature, upcoming appointments for a wearer, speed of movement, GPS location, etc.). More complex augmented reality systems may superimpose "virtual" tangible objects onto a scene, such as walls, artwork, individuals and similar elements. These may update, in real-time so that images presented on the augmented reality display appear to be present within a location to a wearer.

In either system, the movement of a wearer of such a headset may be tracked in order to react to user movements and update the images being presented. This tracking utilizes sensors, such as gyroscopes, accelerometers, magnetometers, and, in some cases, cameras or color sensors that generate data pertaining to position, motion, and orientation of a headset. This tracking data can be used to generate information such as angular velocity, linear acceleration, and gravitational data that may in turn be used to adjust the display of the headset in response to wearer movement.

Predictive movement has been incorporated into virtual reality and augmented reality headsets in the past. However, sample rates for the sensors identified above have typically been quite long—on the order tens of milliseconds—relative to the acuity of human vision. Because the time between samples is long, these predictions often result in so-called "overshoot" where a prediction overshoots the actual head position and orientation or must be smoothed so severely to avoid other problems that they result in predictions sufficiently inaccurate that merely not predicting movement delivers better results.

DESCRIPTION OF THE DRAWINGS

FIG. 6, made up of FIGS. 6A and 6B, is an example of jitter produced by predictive motion tracking.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Dynamic application of motion prediction so as to take into account various factors including jitter, latency and overall responsiveness of the virtual reality system can significantly reduce the problems associated with predictive movement tracking. For example, only applying predictive movement to headsets that are moving and only to a degree suitable for the size of that movement provides better overall predictive accuracy than merely enabling predictive tracking for all movements and to the same degree (over the same prediction interval).

Similarly, smoothing, for example, regression-based averaging of recently detected movements may be applied much more aggressively when motion data indicates that a headset is substantially motionless, but much less aggressively when motion data indicates that a headset is moving at a relatively high angular velocity or is increasing in angular acceleration. This is because human eyes are very sensitive to so-called "jitter" when the head is substantially motionless than when a human head is turning. Jitter occurs when a series of tiny slight variations in sensor measurements causes the resulting rendered video to "bounce." When a head is motionless, this jitter is highly-visible. When in motion, jitter is almost completely unnoticed by human perception.

These types of dynamic scaling of both smoothing and motion prediction may be referred to as perceptually tuned filtering because they rely upon discoveries related to human perception in conjunction with an understanding of the technical limitations of hardware available for use in virtual reality systems.

Description of Apparatus

Figure 1:
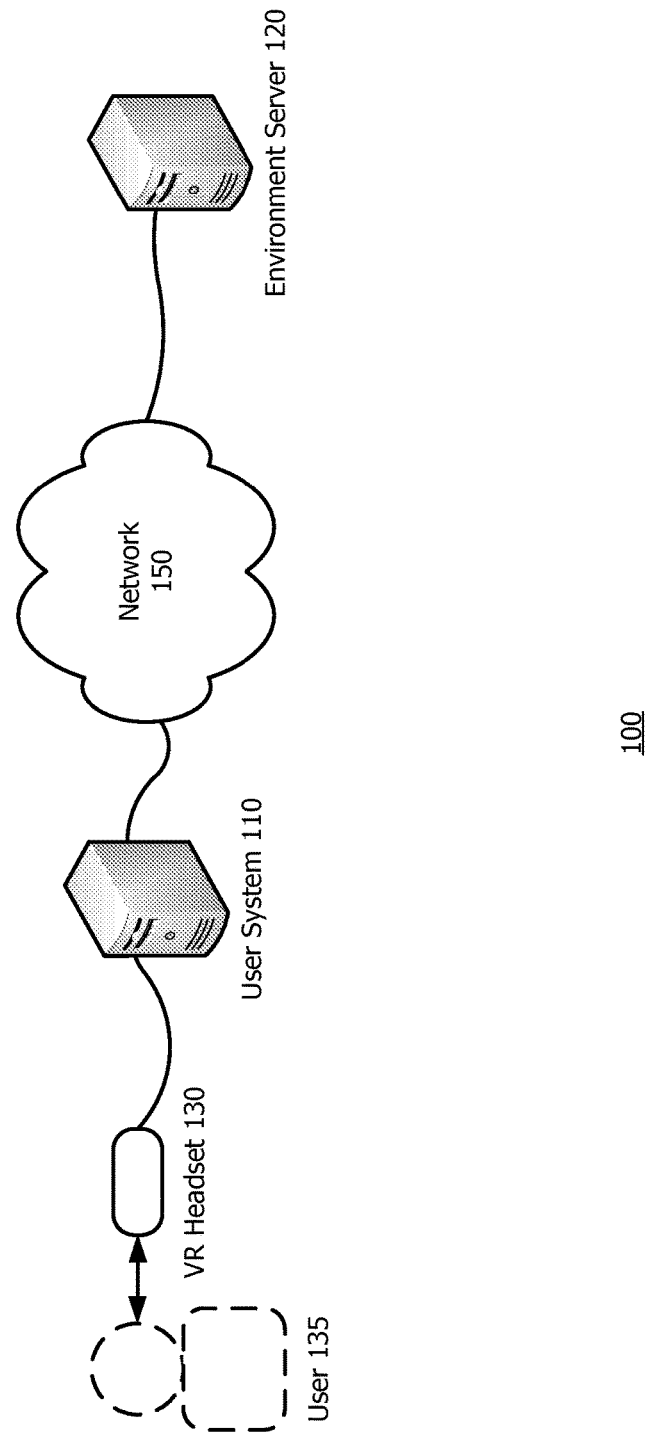
FIG. 1 is an overview of a virtual reality system.

Referring now to FIG. 1, an overview of a virtual reality system 100 is shown. The system includes a user system 110 and an environment server 120 connected by a network 150, and a VR headset 130. A user 135 is also shown, though the user 135 may be considered separate from the system 100.

The user system 110 is a computing device that connects to and interacts with the VR headset 130 in order to generate a virtual reality environment for display on the VR headset. The user system 110 may be, for example, a typical desktop computer, a video game console, such as the Microsoft® Xbox®, the Nintendo® Wii® and Wii U® and Sony® PlayStation® consoles. The user system 110 may, in some cases, be a mobile device, such as a mobile telephone, tablet computer, or other handheld or smaller computing device. The user system 110 may include task-specific hardware, such as a video processor typically used by computing devices for rendering three-dimensional environments. The video processor may be housed within a stand-alone video card or may be integrated into a larger processor or system-on-a-chip.

Typically, the user system 110 will run software, including operating system software and potentially virtual environment software that generates images of a virtual environment for display on the VR headset 130. The virtual environment software may be, for example, video game software that generates images of a three-dimensional world such that a wearer of the VR headset 130 appears to be "in" the virtual environment of the game world.

The environment server 120 is a computing device. The environment server 120 may be optional depending upon the implementation of the virtual reality system 100. In instances in which the virtual environment 100 is multi-user or multiparty, the environment server 120 may provide some of the data used by the user system 110 in order to render the virtual environment.

For example, the environment server 120 may maintain and communicate, via the network 150, data pertaining to other users simultaneously connected to the virtual environment being rendered by the user system 110. In this way, user avatars for a series of users of VR headsets, like VR headset 130, may appear within the virtual environment together. As one user "moves" within that environment, the environment server 120 may receive that data and pass it on to user systems, like user system 110, associated with the other users. Thus, the environment server 120 may enable a group of users to experience a virtual environment together in real-time.

In some embodiments, particularly those that do not include any multi-user or multiparty experiences, the environment server 120 may be unnecessary. In such instances, the user system 110 may take all responsibility for rendering the virtual environment.

The VR headset 130 is a computing device, like the user system 110, but with a few special characteristics. The VR headset 130 includes at least one integrated display and includes one or more sensors that may be used to generate motion, position, and/or orientation data for the VR headset 130. As a wearer of the VR headset 130 moves, the sensors generate motion, position, and/or orientation data and transmit that to the user system 110. The user system 110 returns one or more images to be displayed on the display integrated into the VR headset 130.

The VR headset 130 may be connected to the user system 110 by standard computer input and output interfaces such as USB®, HDMI, DVI, VGA, fiber optics, DisplayPort®, Lightning® connectors, Ethernet or by a custom interfaces specifically designed for connecting the VR headset 130 to a user system 110. Typically, at least a part of these connections will be relatively high-throughput to ensure that rendered video data images are displayed with as little delay as possible on the integrated display. In some cases, wireless connections, using 802.11 protocols, Bluetooth, or radio frequency may be used to transmit a portion of the data between the user system 110 and the VR headset 130.

The VR headset 130 may integrate some or all of the functionality of the user system 110. However, using current technology, these systems remain distinct from one another primarily because the processing power and storage necessary to render a convincing virtual environment, and to perform the motion extrapolation described herein, are better left to more powerful and larger processors currently available only in larger or more expensive computing devices like the user system 110.

In some instances, such as when the user system 110 is a mobile device such as a tablet or mobile phone, the sensors of the mobile device and the display of the mobile device may take the place of all or a part of the VR headset 130 functionality. For example, the display of the mobile device may become the display of the VR headset 130.

The user 135 is a wearer of the VR headset 130. The user 135 wears the headset in such a way that he or she can see the display integrated into the VR headset 130. The user 135 may interact with other peripherals, such as a mouse, keyboard, headphones, speakers, microphones, hand-held controllers or other, similar interactive components (not shown) to further direct the user system 110 as it renders a virtual environment for display on the VR headset 130.

The network 150 is a wired or wireless network that connects the user system 110 to the environment server 120. This network 150 may be or include the Internet or a local area network (LAN) or a wide area network (WAN). The network 150 may utilize typical protocols such as TCP/IP, Ethernet, or other large-scale networking protocols in order to facilitate communication between the user system 110 or 120. Custom protocols may be used. Communications from the environment server 120 to the user system 110 (and other user systems) may use broadcast protocols rather than protocols ensuring delivery. This may enable the environment server to continually update data on the user system 110, without waiting for a plurality of user systems to confirm receipt of the last data.

Figure 2:
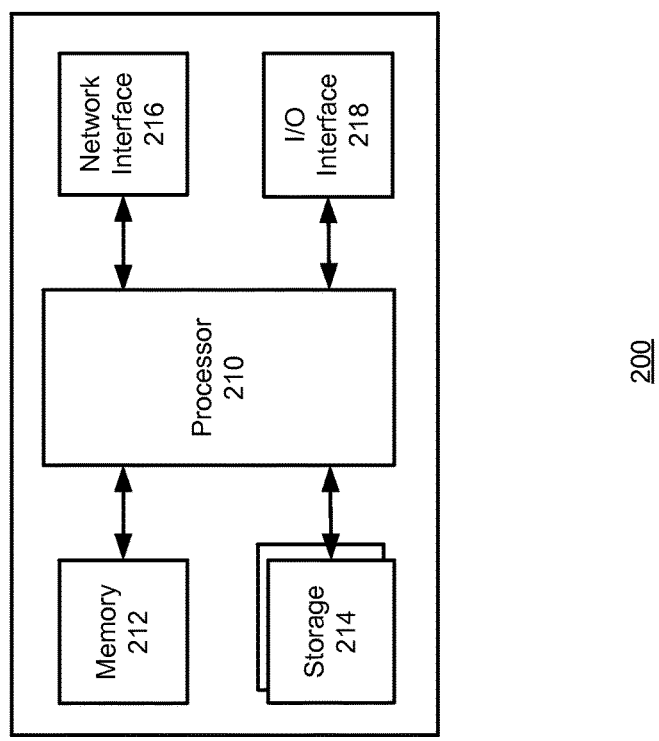
FIG. 2 is a block diagram of a computing device.

Turning now to FIG. 2, a block diagram of a computing device 200 is shown which is representative of the server computers, client devices, mobile devices and other computing devices discussed herein. The user system 110 and environment server 120 are examples of computing devices.

The computing device 200 may include software and/or hardware for providing functionality and features described herein. The computing device 200 may therefore include one or more of: memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 212, storage 214, a network interface 216 and an I/O interface 218. The processor may be or include one or more microprocessors, integrated specific function processors (such as video processors), application specific integrated circuits (ASICs), or systems on a chip (SOACs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210.

The storage 214 provides non-volatile, bulk or long term storage of data or instructions in the computing device 200. The storage 214 may take the form of a disk, tape, CD, DVD, SSD (solid state drive) or other reasonably high capacity addressable or serial storage medium. Multiple storage devices may be provided or available to the computing device 200. Some of these storage devices may be external to the computing device 200, such as network storage or cloud-based storage.

The network interface 216 includes an interface to a network such as network 150 (FIG. 1).

The I/O interface 218 interfaces the processor 210 to peripherals (not shown) such as the VR headset 130, displays, keyboards, mice, controllers, USB devices and other peripherals.

Figure 3:
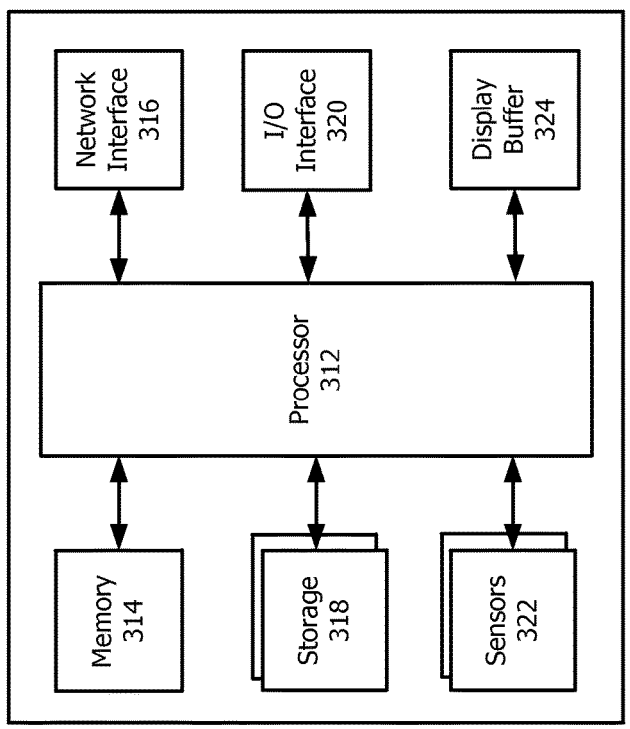
FIG. 3 is a block diagram of a virtual reality headset.

FIG. 3 shows a block diagram of a virtual reality headset 300 having a computing device substantially the same as that discussed above with respect to FIG. 2. The elements discussed above with respect to FIG. 2 will not be repeated here. This computing device of the virtual reality headset 300 may be entirely or partially implemented as a system-on-a-chip.

The processor 312 may be lower powered than that available to a full-size computing device. The memory 314, network interface 316, storage 318, and input/output interface 320 may be integrated into a single package and may be designed for a small instruction set in order to provide quick response times.

The sensors 322 are sensors used to generate motion, position, and orientation data. These sensors may be or include gyroscopes, accelerometers, magnetometers, video cameras, color sensors, or other motion, position, and orientation sensors. The sensors 322 may also include sub-portions of sensors, such as a series of active or passive markers that may be viewed externally by a camera or color sensor in order to generate motion, position, and orientation data. For example, a virtual reality headset may include on its exterior a series of markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. In this sense, these markers are not "sensors," but they make up a sub-part of a sensor system that is used to generate motion, position, and orientation data.

The sensors 322 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

The virtual reality headset includes a display buffer 324, where image data for display is stored immediately before it is presented on the display, and may be or include the memory 314 available to the processor 312. In this way, the display may function rapidly in response to input from the processor 312.

The display (not shown) of the virtual reality headset 300 may be one or more displays. The display may, for example, sit immediately in front of the eyes of a wearer of the VR headset 130. The display may, then, be relatively lower resolution while still filling a large visual area to the wearer. The display displays the virtual environment to the wearer as rendered by the user system 110.

Figure 4:
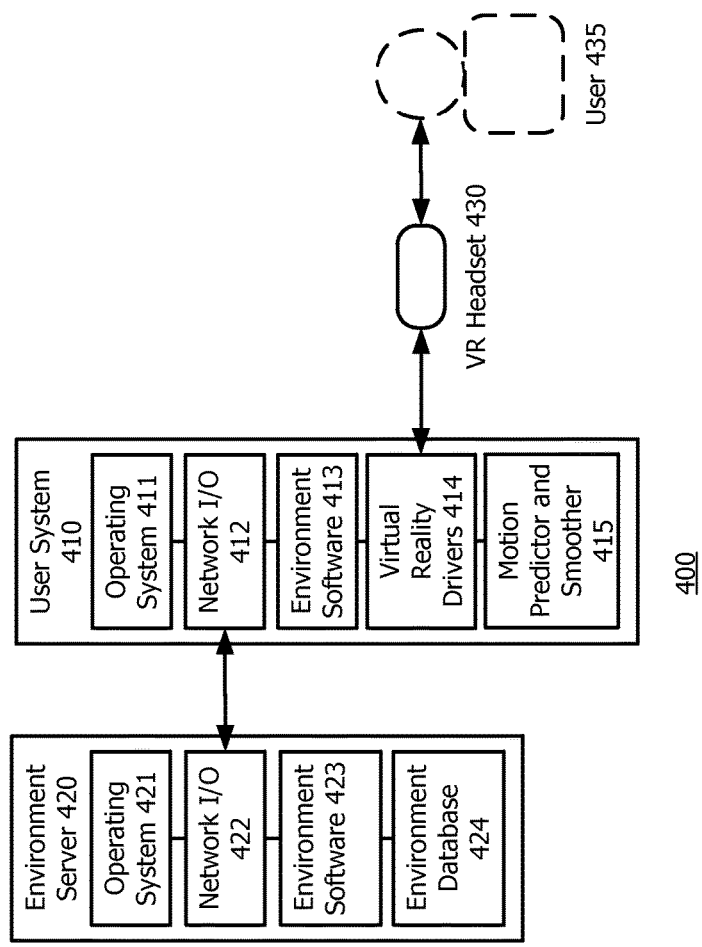
FIG. 4 is a functional diagram of a virtual reality system.

Turning to FIG. 4, a functional diagram of a virtual reality system 400 is shown. The virtual reality system 400 includes a user system 410, an environment server 420 and a VR headset 430. These may correspond to the user system 110, environment server 120 and the VR headset 130 of FIG. 1. A user 435, which is not a part of the system, is also shown.

The user system 410 includes an operating system 411, network input/output interface 412, environment software 413, virtual reality drivers 414, and a motion predictor and smother 415.

The operating system 411 is the operating system of the user system 410. This may be, for example, a Windows®, OSX®, Linux or other operating system if the user system 410 is a personal computer or similar device. The operating system 411 may be a proprietary system, such as the operating systems employed in typical video game consoles. Still further, the operating system 411 may be iOS®, Android® or a similar mobile device operating system if the user system 410 is a mobile device. The operating system 411 provides an environment for other software, drivers and peripherals to function.

The network input/output interface 412 enables the user system 410 to communicate with the environment server 420 (when present). The network input/output interface 412 may include typical network drivers and software particular to the environment software 413 that enables network communication.

The environment software 413 is the software that operates in conjunction with the other components to create the environment that is presented as virtual reality. For example, environment software may be video game software that generates a three-dimensional world for presentation on the display of the VR headset 430. The environment software 413 may include specialized software to enable it to render multiple displays from different angles simultaneously-as is typical in a VR headset, two displays or two distinct images on a single display are provided, one for each eye. The environment software 413 may be integrated with software designed specifically to enable it to output content suitable for the VR headset 430.

The environment software 413 need not be video game software, but may be any type of virtual reality or augmented reality environment software. This software may generate virtual reality locations including fictional locations, historical locations, educational locations, or almost any immersive environment that simulates reality.

The virtual reality drivers 414 may be a software overlay between the operating system 411 and environment software 413 and the VR headset 430. The virtual reality driver 414 accepts input from the environment software 413 in particular and outputs data to the VR headset 430 in a form suitable for display by the VR headset 430. The virtual reality drivers 414 may interact with the VR headset 430 on one or more levels of abstraction below the software level in order to speed the transmission and use of environment data to enable the VR headset 430 to react quickly. This may be especially true when the user system 410 is a more powerful system (e.g. including a more powerful processor) than the VR headset 430. In this way, the VR headset 430 may accept more raw data that may be directly displayed on the VR headset 430 without any substantial additional processing required by the VR headset 430.

The motion predictor and smoother 415 is software responsible for predicting movement, orientation, and position of the VR headset 430. The motion predictor may be a part of the virtual reality drivers 414.

The motion predictor and smoother 415 may accept data from sensors in the VR headset 430 in order to operate upon that data and to generate a prediction of VR headset 430 movement, orientation, and position. The motion predictor and smoother 415 may, for example, average angular velocity measurements over a short time frame (e.g., ten measurements over the last ten milliseconds) to derive a prediction about the future movement, orientation, and position. Alternatively, the motion predictor and smoother 415 may differentiate over a series of angular velocity measurements to derive an angular acceleration and extrapolate into the future a predetermined time to predict a future movement, orientation, and position. The prediction process will be described more fully below with reference to FIG. 8.

In addition, the motion predictor and smoother 415 may perform "smoothing" operations on sensor data. In the rawest form, motion, orientation, and position data received from a series of sensors in the VR headset 430 may be slightly inaccurate. For example, with sample rates in the one per millisecond range, occasionally, tiny variations in the orientation, movement, or position of the VR headset 430 may result in incremental sensor readings that do not represent actual changes in movement, orientation, or position.

For example, even if a user wearing the VR headset 430 is substantially still, the sensors may still report minor variations. Using this data, the images generated for display on the VR headset may include tiny variations that are not representative of real changes in the VR headset 430. As a result, so-called "jitter" in the display of the VR headset 430 may be introduced. This appears to the user of the VR headset 430 as an image "bouncing" around in tiny increments in response to these tiny variations in data received from the VR headset 430 sensors.

In response to this jitter and other similar errors, the motion predictor and smoother 415 may also apply smoothing to the received data. This smoothing may, for example, take a series of recent readings from the sensors and average them to derive the data used to actually generate the movement, orientation, and position data that is used to create the next image for display on the VR headset 430. Other smoothing methods may also be used such as linear or nonlinear filtering whereby sensor data is extrapolated over a time period, while removing likely-outlier data.

The environment server 420 includes an operating system 421, a network input/output interface 422, environment software 423, and an environment database 424. The operating system 421 and network input/output interface 422 serve substantially the same function as those described for the user system 410 above except on behalf of the environment server 420. The operating system 421 is more likely to be an operating system supporting multiple user connections, for example via a network. Similarly, the network input/output interface 422 may also better support multiple connections or be provided with faster connections to a network.

The environment software 423 serves a different purpose than the environment software 413 on the user system 410. The environment software is not actually responsible for rendering any three dimensional world for presentation to a user. Instead, it may maintain a state for a plurality of users connected to the environment server 420. For example, if hundreds of users are simultaneously connected to the environment server 420, the environment software 423 may maintain an environment database 424 that indicates the locations, actions, movements and other data for each of those users. The environment database 424 may dynamically-update and store those locations in order to transmit that data to user systems, like user system 410 so that the user system 410 environment software 413 can update its visual display to incorporate that data. This may be, for example, the location within the three dimensional environment rendered by the environment software of an avatar representative of another user.

The VR headset 430 may be the substantially the same as the VR headset 130 in FIG. 1 and include the computing device 300 in FIG. 3. The VR headset 430 may be worn by a user 435 in order to experience a virtual reality or augmented reality virtual environment.

Figure 5:
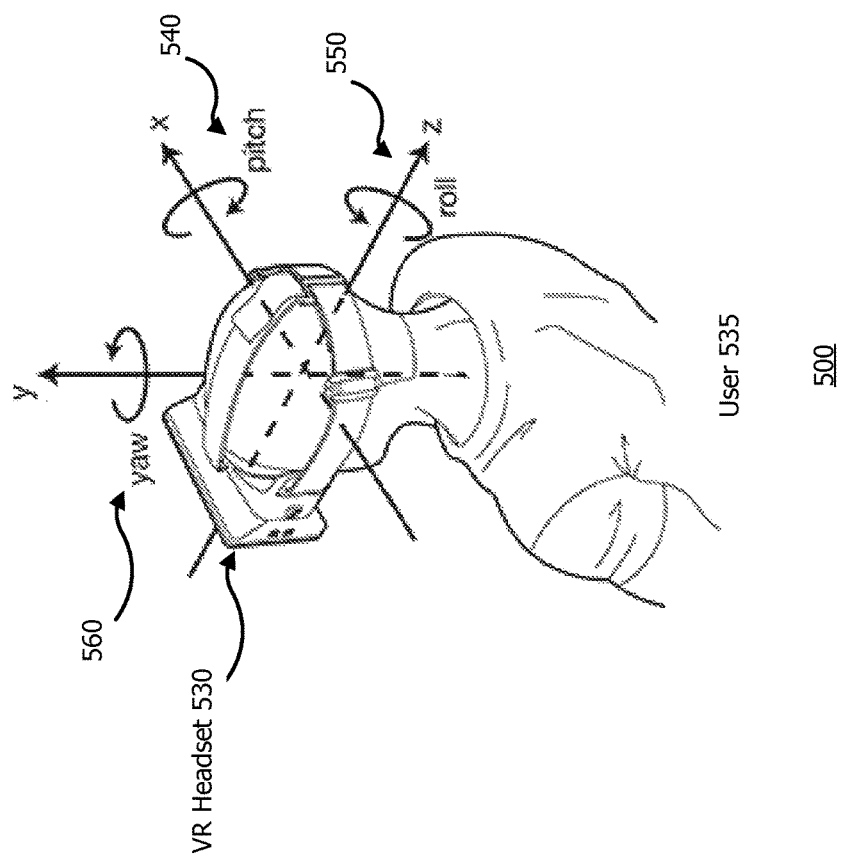
FIG. 5 is a user wearing a virtual reality headset.

Turning now to FIG. 5, a user 535 wearing a virtual reality headset 530 is shown. The VR headset 530 is worn over the eyes of user 535. The user 535 head may be considered at the center of a three-dimensional axis with axes of pitch 540, roll 550 and yaw 560. Pitch 540 is an x axis, roll 550 is a z axis and yaw 560 is a y axis in a three-dimensional Cartesian coordinate system.

Movement of the VR headset 530 (user movement) may be expressed as pitch 540, roll, 550 and yaw 560. One method for expressing a three-dimensional orientation uses quaternions. This is because any three-dimensional orientation can be represented by a quaternion expressed in the form $q(v, \theta) = (\cos(\theta/2), v_x \sin(\theta/2), v_y \sin(\theta/2), v_z \sin(\theta/2))$ in which $q(v, \theta)$ represent the same rotation. Quaternions have the benefit of enabling manipulations of rotations with relatively few parameters while preserving geometry (for example, the Haar measure) under algebraic operations, which is very useful for performing prediction in three-dimensional space.

The Haar measure helps to ensure that multiple rotations of an object in three-dimensional space remain related to one another. For example, applying a third rotation to two earlier rotations would, preferably, result in those two earlier rotations still being separated by the same distance. Maintaining consistency with respect to the Haar measure helps to ensure this and functions well in conjunction with quaternions.

FIG. 6, made up of FIGS. 6A and 6B, shows an example of jitter produced by predictive motion tracking. FIG. 6A shows a scene as two images 620 and 622 presented on a VR headset. Two images 620 and 622 are shown, one for each eye and from slightly different perspectives, in order to create the perception of depth in the scene. For example, the individual 630 in the scene may be seen from slightly different angles in each image 620, 622. As a result, the mind perceives the individual 630 having depth of field. This increases the immersion.

FIG. 6B shows a slightly different scene including images 640 and 642. Here, the individual 650 has "moved" upward in the scene. This type of movement may occur in situations in which predictive tracking is applied and there are minor sensor errors and drift in the sensor detection. For example, a minor fluctuation in the sensors suggesting that a wearer's head is "looking up", may cause a predictive motion tracking system to over-extrapolate this motion data into a drastic movement that is not present.

In FIG. 6B, a minor fluctuation has been extrapolated to create motion data for motion that is not present. The wearer's head is substantially stationary. If this happens several times over the course of a few seconds, the effect is drastic. Although the image is exaggerated so that it is more easily recognizable in FIG. 6B, a wearer of a motionless VR headset experiences even minor jitter as extremely non-immersive because a wearer's brain believes that it is stationary. Visually perceived movement data, even small jitter, that does not correspond with actual head movement (or non-movement) does not match with the wearers remaining perception.

Figure 7:
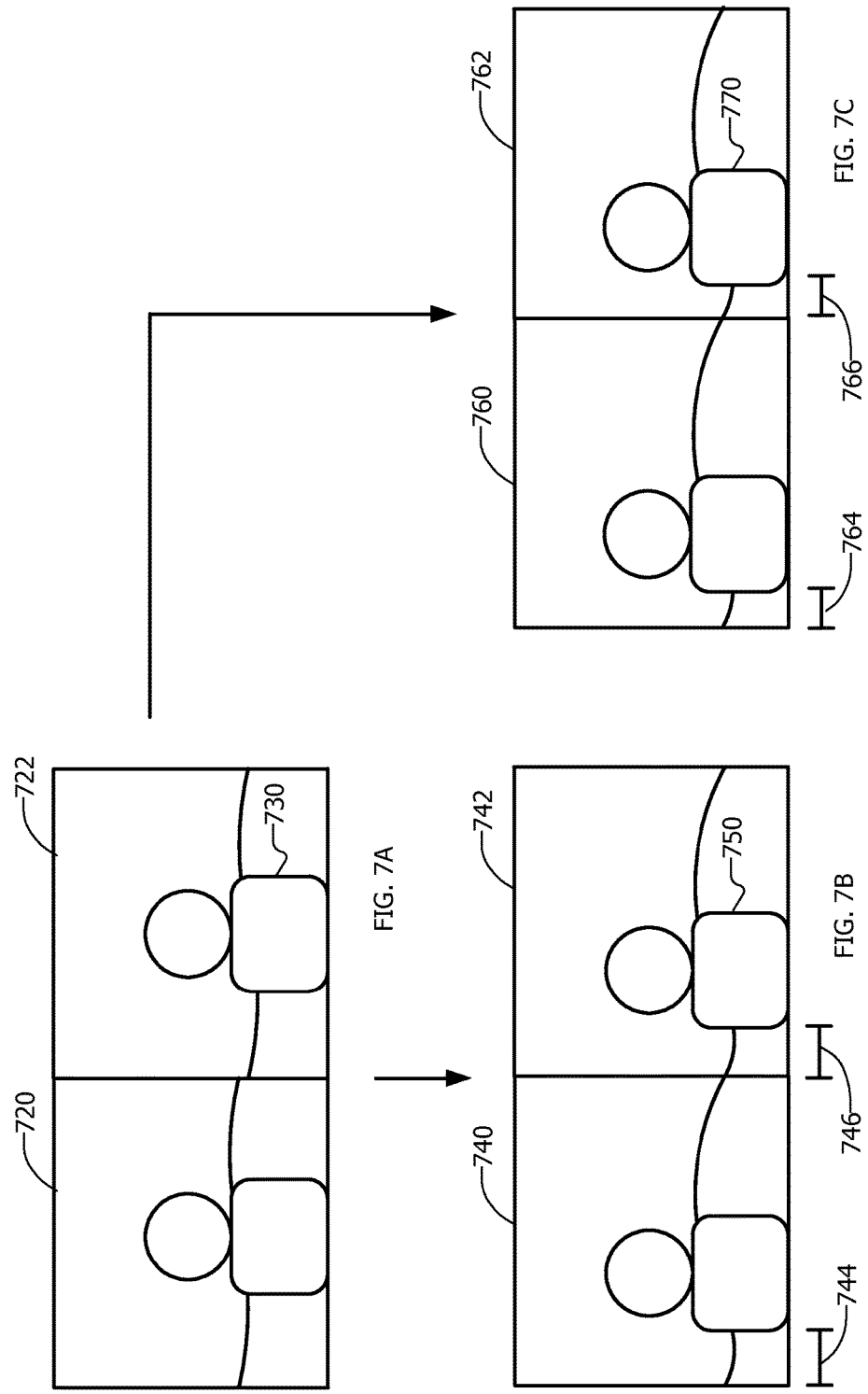
FIG. 7, made up of FIGS. 7A, 7B and 7C, is an example of predictive motion tracking compared to actual motion.

FIG. 7, made up of FIGS. 7A, 7B and 7C, shows an example of predictive motion tracking compared to actual motion. FIG. 7A shows the same scene as FIG. 6A with images 720, 722 and individual 730.

FIG. 7B is a scene rendered using predictive motion tracking to extrapolate a wearer's movement over a time frame into the future. The images 740, 742 are updated such that individual 750 appears to have moved to the left. In visual perception, this is likely because the wearer began the process of turning his or her head to the right, causing the individual 750 to begin moving out of the field of view.

The predictive motion tracking has predicted the location of the individual 750 (and the orientation of the entire scene) based upon motion, orientation, and position data extrapolated from sensor data generated by sensors for the associated VR headset. For example, the motion, orientation, and position data may indicate that the VR headset is moving along a particular path, and at a particular angular velocity (or potentially linear velocity or angular or linear acceleration). The scene in 7B may be extrapolated (or predicted) over a given time frame.

FIG. 7C shows a scene including two images 760 and 762, including individual 770 that corresponds to the actual motion, orientation and position of a VR headset. Careful examination of FIGS. 7B and 7C indicates that the predicted motion was slightly incorrect. Specifically, the individual 750 did not move sufficiently far to the left in the field of view as compared to the actual motion, orientation, and position shown in images 760 and 762. As a result, the individual 770 is slightly further left in the scene. These errors are shown by comparing predicted distances 744 and 746 with actual distances 764 and 766.

Testing has indicated that when the processes described herein are used, these minor errors are virtually non-existent. However, predictive motion tracking inherently includes some margin of error—it is a prediction of a wearer's movements before they occur. However, when the errors are small, particularly in virtual reality systems, and because the time-frames these errors are visible are very fast, the wearer's mind typically does not carefully perceive the differences.

Description of Processes

Figure 8:
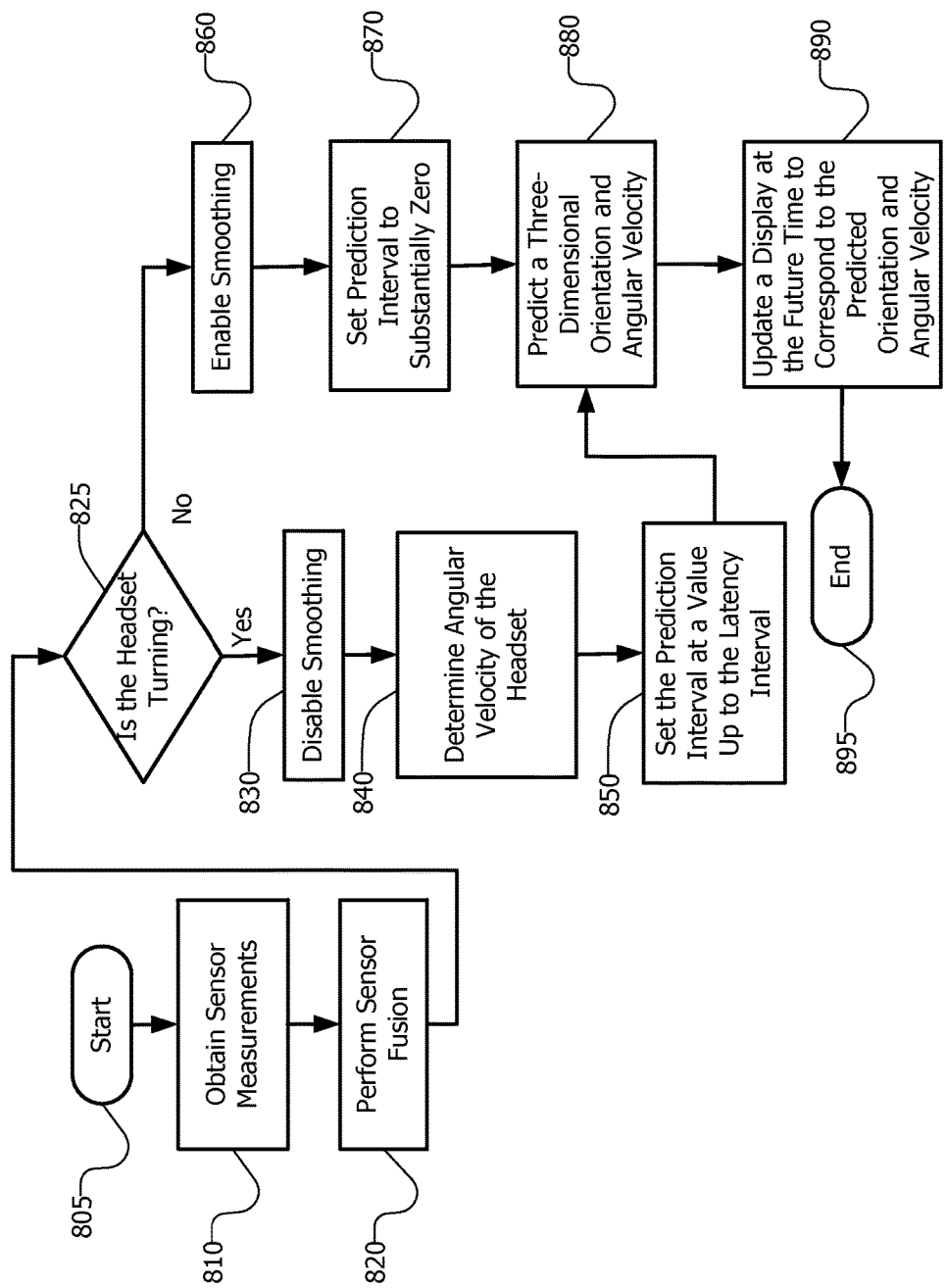
FIG. 8 is a flowchart showing perceptually tuned filtering as applied to a predictive motion tracking process.

Referring now to FIG. 8 a flowchart showing perceptually tuned filtering as applied to a predictive motion tracking process. The flow chart has both a start 805 and an end 895, but the process is cyclical in nature. In fact, the process is almost constantly iterating as a VR headset is active on a wearer's head. For each frame of rendered video, the process may iterate at least once and, potentially, several times.

First, sensor measurements are obtained from the sensors, including sensors that may be in the VR headset, at 810. As discussed above, these sensors may include accelerometers, gyroscopes, magnetometers, active or passive markers and cameras. The cameras may be mounted on the headset with markers mounted in the surrounding environment or markers may be mounted on the headset and one or more external cameras may track the markers. The function of these sensors is to provide accurate data from which predictions of motion, orientation and position may be derived. Wherever and whatever the sensors, the sensors provide data to, for example, the user system to begin the process of perception based prediction.

Next, sensor fusion is performed at 820. This process may be complex or may be simple. In a simple system, the raw data measurements (for example, acceleration and velocity from an accelerometer) may merely be combined and standardized into a form suitable for use by environment software in rendering a three dimensional environment. In more complex systems, the data may be "smoothed," as discussed above, and data extrapolating potential predictions for headset motion may be generated at the sensor fusion stage and passed along to subsequent stages.

A determination is made, for example using the virtual reality drivers 414, whether the headset is turning at 825. This determination is relatively simple. A series of angular velocity measurements may be generated over a short time period (e.g. 10 milliseconds) by the sensors. Those measurements may be averaged to determine if the angular velocity exceeds a predetermined threshold, for example, 1-5 degree per second. In this way, a relatively minor movement (or a small number of sensor errors) will not be perceived as "movement" of the headset.

A human head wearing a VR headset cannot remain perfectly still, but a movement threshold can be set in such a way that the determination whether a headset is turning 825 can be made. A non-turning head is substantially stationary. As used herein the phrase "substantially stationary" means that the headset is not in the process of a head turn of a sufficient degree that the virtual reality system should re-render the associated scene to reflect that movement. Specifically, "substantially stationary" does not mean absolutely zero movement of the VR headset, but does mean "stationary" to the extent that a human, without attempting to move, can hold his or her head "still."

If the headset is turning, then smoothing is disabled at 830. As discussed somewhat above, smoothing is primarily directed to counteracting sensor artifacts, minor movements, and sensor drift (linear or exponential drift in accuracy of sensors) so that these do not harm the experience of a wearer by producing jitter or random movement of the rendered scene. After some study of human perception, it has been discovered that individuals perceiving virtual reality environments do not experience jitter at all when their heads are turning. In particular, the mind either ignores jitter or is used to experiencing some irregularity in a visual scene as a head turns and automatically compensates.

As a result, if the headset is turning, smoothing may be disabled, at least temporarily. This frees up some processor cycles to work on other problems, but more importantly, it ensures that any predictive motion tracking is not hindered by any pre- or post-calculation smoothing of the data. Heavy smoothing can cause rendered frames to appear to lag behind actual movements, for example, by over-weighting prior data indicating smaller (or no) movement or can result in overshoot. Thus, when the head is turning, no detrimental effect for a wearer is recognized by disabling smoothing, and the benefit is more responsive scene rendering as the headset turns.

Next (or substantially simultaneously), an angular velocity of the headset is determined at 840. This determination may be a single measurement or single data set generated by the sensor fusion at 820. Preferably, the angular velocity is determined using one of a number of options from an average of a predetermined prior set of angular velocity measurements (e.g. the most recent 10 measurements) to a weighted average of a similar set of angular velocity measurements, with additional weighting applied to the most recent set of measurements (e.g. the most recent 1-3 measurements) to a determination of the linear acceleration by differentiation and extrapolation of that acceleration (or deceleration as the case may be) over an interval.

The next step is to set the prediction interval over which the motion prediction will take place at 850. As used herein, the "prediction interval" is the time over which the prediction of motion is made. For example, if the prediction interval is 40 milliseconds, the predictive motion tracking predicts the motion, orientation, and position of the headset at the end of that prediction interval, 40 milliseconds from now. If the prediction interval is zero, the predictive motion tracking predicts the motion, orientation, and position of the headset at the present time (effectively providing no predictive motion tracking). Including a prediction interval enables the predictive motion tracking system to dynamically respond to the size and scope of headset movements.

This prediction interval may be quite small, and is, for small movements. For example, movements on the order of 10 degrees/second may have a prediction interval set very small, for example to 5 milliseconds. In such situations, the angular velocity measurement, determined by whatever method, are applied over that time period and provided in place of actual data for that time period, to a user system for rendering of the associated video frames. The next frame of rendered video is delivered based upon the resulting prediction.

In situations in which the angular velocity measurement is quite large, relatively speaking (e.g., on the order of 500 degrees/second) the prediction interval over which the system predicts the movement is made much larger. For example, fast movement causes the system to set the prediction interval to be between 30 and 60 milliseconds. In these situations, the motion prediction data that is passed to a video renderer predicts a wearer's motion, orientation, and position at the end of that prediction interval and delivers the next frame of rendered video based upon that prediction.

In well-studied systems, the latency interval may be well known. The phrase "latency interval" is the time from when motion data is generated by the sensors to the delivery of a rendered frame of video incorporating that motion data. In the present system, that latency interval is on the order of 30 to 60 milliseconds and appears to typically be approximately 40 milliseconds.

This latency interval may be used as an upper bound for the prediction interval. So, the prediction interval may not exceed the latency interval. This is because as a user moves his or her head while wearing the headset, the next rendered frame of video incorporating that data will appear at the next latency interval.

Accordingly, predicting beyond that time frame is unnecessary and more likely to result in overshoot (rendering too great a movement or a stop when movement was just beginning) and disconnection from actual wearer movement. Similarly, additional data will be available, in the system described, tens of additional motion, orientation, and position data points that can be used to render the next frame of video. Predicting motion up to the latency interval has the benefit of attempting to predict actual user movement with the next moment that user will see a frame of rendered video.

The process may work, for example, such that a determination is made as to the angular velocity of a given wearer movement. When the angular velocity above a threshold rate, for example 0.3 radians per second, then the time over which prediction is increased linearly up to the latency interval. This increase in the prediction interval may be, for example, +2 milliseconds per radian per second. In this way, a headset turning at 1 radians per second, would utilize a prediction interval of 2 milliseconds in the future. A headset turning at 10 radians per second would utilize a prediction interval of 20 milliseconds in the future. Other linear increase slopes may be used, up to a maximum prediction interval equal to the latency interval (e.g. 40 milliseconds into the future).

Thus, if the angular velocity is substantially zero (e.g. 0 to 0.03 radians per second) the orientation in three dimensions is derived using smoothing and reliant upon the current position and orientation (without prediction). If the angular velocity is greater than substantially zero, then prediction algorithms are used and smoothing is disabled. Finally, the position (place in three-dimensional space) is derived, regardless, using the last measured position, plus the linear velocity over the selected possible prediction interval.

To summarize, the movement of the headset is measured to determine whether or not movement (angular velocity) of the headset is substantially zero (0 to 0.3 radians per second). If so, smoothing of the data is enabled and the prediction interval is set to substantially zero (or zero). If the headset is moving (angular velocity) at a rate larger than substantially zero (greater than 0.3 radians per second), then smoothing is disabled and the prediction interval is set. If the movement is increasing in angular velocity, then the prediction interval rises by a prediction interval variance (e.g., 2 milliseconds per radian per second) per reading up to a maximum of the latency interval (e.g., 40 milliseconds).

The increase in the prediction interval (up to the maximum of the latency interval) may be linear, corresponding to linear movement of a headset. As a result, faster movement is compensated for by linear increase in prediction interval as described above. Alternatively, a so-called smoothstep algorithm may be used. Smoothstep algorithms take the generalized form smoothstep(t)=$3t^2-2t^3$ where t is the variable to be smoothed and the results of the generalized form fall between 0 and 1. Smoothstep has the benefit of being sloped toward zero at both the high and low end. In this way, the prediction differs from linear interpolation by being "rounded off" at the ends. This appears to a wearer of such a headset relying upon a prediction interval in that the prediction more slowly approaches the maximum or minimum without immediate or abrupt stops or starts at either end. As a result, the prediction interval can "smoothly" approach zero or approach the maximum latency interval.

If the headset is not turning at 825, indicating that the user's head is substantially still, then smoothing may be enabled at 860. As discussed above, smoothing is most helpful when the headset is not moving or is making very small movements. In particular, it helps to avoid unnecessary or over-exaggerated movement of the scene, such as jitter, when a headset is substantially still. As such, enabling smoothing when a headset is substantially still will aid in reducing these issues.

Similarly, the prediction interval is set to substantially zero at 870. When the head is virtually non-moving, aggressive prediction over any interval is not necessary. Some predictive motion tracking may be applied, but to the extent that it is, the interval over which it is applied is set to a very short time frame, such as 5 milliseconds or less. In some cases, the prediction interval may be set to zero. This further helps to avoid predictive motion tracking that may exaggerate small movements, particularly if the prediction interval is set at or near the latency interval.

Next, whether the headset is turning or not at 825, and after setting the prediction interval at 850 and 870, a prediction of a three-dimensional orientation and angular velocity are made at 880. In effect, this predicts the motion, orientation and position of the headset at the end of the prediction interval. This may be expressed, as described above, as a quaternion, but may be expressed in any number of methods.

Finally, a display is updated at the next rendered video frame to correspond to the predicted motion, orientation, and position based upon the prediction and the prediction interval at 890. As a result, if the prediction interval was 40 milliseconds, the next rendered frame of video delivered to the VR headset will be rendered as though the wearer's head was at a predicted position 40 milliseconds from now. If the prediction interval was zero milliseconds, then the next rendered frame of video delivered to the VR headset will be rendered as though the wearer's head was at a predicted position at the present time (no prediction is necessary, actual data is available). So, no prediction or a very limited prediction is provided.

Both of these options and extremes reflect the fact that the head is turning or is not turning at 825. Once the display is updated, the process ends. However, as described above, the process repeats for every sensor update or for every interval of sensor updates (e.g. every 10 or 20 sensor updates). In this way, the next frame of rendered video may be provided, either with or without smoothing and with or without a prediction interval at or near a latency interval.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

What is claimed is:

1. A method comprising:
   determining a first three-dimensional orientation of a head mounted display, the head mounted display comprising one or more inertial measurement units ("IMUs") and one or more markers on an outside surface of the head mounted display;
   detecting a movement of the head mounted display;
   obtaining, from the one or more IMUs, first data representative of the detected movement of the head mounted display;
   obtaining, from one or more cameras external to the head mounted display, second data representative of the detected movement of the head mounted display based on a movement determined by the one or more cameras of the one or more markers;
   predicting a second three-dimensional orientation of the head mounted display based on both the first data representative of the detected movement and the second data representative of the detected movement; and
   generating a rendered image corresponding to the predicted second three-dimensional orientation of the head mounted display for presentation by the head mounted display.

2. The method of claim 1, wherein at least one of the one or more IMUs comprises one of: a gyroscope, an accelerometer, and a magnetometer.

3. The method of claim 1, wherein at least one of the one or more markers comprises one of: a reflector and a light.

4. The method of claim 1, wherein at least one of the cameras external to the head mounted display is configured to detect one or both of infrared light and visible light from one or more of the markers.

5. The method of claim 1, wherein the one or more cameras are configured to provide a detected location of the one or more markers to a movement engine for use as points of reference, the movement engine configured to determine a movement of the one or more markers based on the detected locations and to generate the second data representative of the detected movement of the head mounted display based on the determined movement of the one or more markers.

6. The method of claim 1, wherein predicting the second three-dimensional orientation of the head mounted display comprises determining an angular velocity of the head mounted display based on the first data representative of the detected movement and the second data representative of the detected movement.

7. The method of claim 6, wherein predicting the second three-dimensional orientation of the head mounted display further comprises determining a prediction interval of time based on the determined angular velocity of the head mounted display.

8. A apparatus comprising a non-transitory computer-readable storage medium storing executable computer instructions, and further comprising a hardware processor, the hardware processor configured to execute the computer instructions to cause the processor to:
   determine a first three-dimensional orientation of a head mounted display, the head mounted display comprising one or more inertial measurement units ("IMUs") and one or more markers on an outside surface of the head mounted display;

detect a movement of the head mounted display;

obtain, from the one or more IMUs, first data representative of the detected movement of the head mounted display;

obtain, from one or more cameras external to the head mounted display, second data representative of the detected movement of the head mounted display based on a movement determined by the one or more cameras of the one or more markers;

predict a second three-dimensional orientation of the head mounted display based on both the first data representative of the detected movement and the second data representative of the detected movement; and generate a rendered image corresponding to the predicted second three-dimensional orientation of the head mounted display for presentation by the head mounted display.

9. The apparatus of claim 8, wherein at least one of the one or more IMUs comprises one of: a gyroscope, an accelerometer, and a magnetometer.

10. The apparatus of claim 8, wherein at least one of the one or more markers comprises one of: a reflector and a light.

11. The apparatus of claim 8, wherein at least one of the cameras external to the head mounted display is configured to detect one or both of infrared light and visible light from one or more of the markers.

12. The apparatus of claim 8, wherein the one or more cameras are configured to provide a detected location of the one or more markers to a movement engine for use as points of reference, the movement engine configured to determine a movement of the one or more markers based on the detected locations and to generate the second data representative of the detected movement of the head mounted display based on the determined movement of the one or more markers.

13. The apparatus of claim 8, wherein predicting the second three-dimensional orientation of the head mounted display comprises determining an angular velocity of the head mounted display based on the first data representative of the detected movement and the second data representative of the detected movement.

14. The apparatus of claim 13, wherein predicting the second three-dimensional orientation of the head mounted display further comprises determining a prediction interval of time based on the determined angular velocity of the head mounted display.

15. A non-transitory computer-readable storage medium storing executable computer instructions that, when executed by a processor, are configured to perform steps comprising:

determining a first three-dimensional orientation of a head mounted display, the head mounted display comprising one or more inertial measurement units ("IMUs") and one or more markers on an outside surface of the head mounted display;

detecting a movement of the head mounted display;

obtaining, from the one or more IMUs, first data representative of the detected movement of the head mounted display;

obtaining, from one or more cameras external to the head mounted display, second data representative of the detected movement of the head mounted display based on a movement determined by the one or more cameras of the one or more markers;

predicting a second three-dimensional orientation of the head mounted display based on both the first data representative of the detected movement and the second data representative of the detected movement; and generating a rendered image corresponding to the predicted second three-dimensional orientation of the head mounted display for presentation by the head mounted display.

16. The non-transitory computer-readable storage medium of claim 15, wherein at least one of the one or more IMUs comprises one of: a gyroscope, an accelerometer, and a magnetometer.

17. The non-transitory computer-readable storage medium of claim 15, wherein at least one of the one or more markers comprises one of: a reflector and a light.

18. The non-transitory computer-readable storage medium of claim 15, wherein at least one of the cameras external to the head mounted display is configured to detect one or both of infrared light and visible light from one or more of the markers.

19. The non-transitory computer-readable storage medium of claim 15, wherein the one or more cameras are configured to provide a detected location of the one or more markers to a movement engine for use as points of reference, the movement engine configured to determine a movement of the one or more markers based on the detected locations and to generate the second data representative of the detected movement of the head mounted display based on the determined movement of the one or more markers.

20. The non-transitory computer-readable storage medium of claim 15, wherein predicting the second three-dimensional orientation of the head mounted display comprises determining an angular velocity of the head mounted display based on the first data representative of the detected movement and the second data representative of the detected movement.

21. The non-transitory computer-readable storage medium of claim 20, wherein predicting the second three-dimensional orientation of the head mounted display further comprises determining a prediction interval of time based on the determined angular velocity of the head mounted display.

* * * * *